United States Patent [19]

Reible, Jr.

[11] 4,370,651

[45] Jan. 25, 1983

[54] ADVANCED PLASMA PANEL TECHNOLOGY

[75] Inventor: George A. Reible, Jr., Saugerties, N.Y.

[73] Assignee: International Business Machines Corporation, Armonk, N.Y.

[21] Appl. No.: 278,270

[22] Filed: Jun. 29, 1981

[51] Int. Cl.[3] ........................ H04Q 9/00; H05B 37/00; H05B 41/14

[52] U.S. Cl. ............................ 340/825.86; 315/169.4; 340/805; 340/777; 340/812

[58] Field of Search ..................... 340/825, 81, 825.86, 340/777, 779, 771, 718, 805, 812, 813; 315/169.4

[56] References Cited

U.S. PATENT DOCUMENTS

| | | | |
|---|---|---|---|
| 4,072,937 | 2/1978 | Chu | 340/777 |
| 4,189,729 | 2/1980 | Baker et al. | 340/718 |
| 4,263,534 | 4/1981 | Martin et al. | 315/169.4 |

*Primary Examiner*—Donald J. Yusko

*Attorney, Agent, or Firm*—Joseph J. Connerton

[57] ABSTRACT

A drive system for a plasma display device includes a background sustain generator which is divided between a discrete analog circuit and an integrated driver chip. The integrated driver chip includes low impedance switch pairs controlled by a pair of comparators which prevent the sustain signal from being degraded during discharge of the panel. By partitioning the elements of the sustain signal generator between discrete and integrated elements, optimum integration cost, circuit performance and system reliability are achieved.

10 Claims, 2 Drawing Figures

ADVANCED PLASMA PANEL TECHNOLOGY

CROSS REFERENCE TO RELATED APPLICATION

United States application Ser. No. 372,384 "IMPROVED METHOD AND APPARATUS FOR A GAS DISPLAY PANEL" filed by Tony N. Criscimagna et al, June 21, 1973.

BACKGROUND OF THE INVENTION

In plasma display devices, conductor arrays disposed on glass substrates are overcoated with a dielectric layer, and the glass plates sealed with the conductor arrays disposed orthogonal to each other, the conductor intersections defining display cells. By applying suitable drive signals selectively to the conductor arrays, the cells located at the intersection of the conductors are discharged, creating a visible display. The resulting wall charge, which occurs on the dielectric surface adjacent the cell area after discharge, produces a wall charge potential which opposes the discharge potential and combines with a sustain signal applied to all conductors to turn off the cells shortly after discharge and to discharge the cells on the next sustain iteration.

Heretofore, as in the aforereferenced co-pending application Ser. No. 372,384, the sustain signal is provided by a background circuit which is generally a high speed, high current, high voltage, low impedance device. The sustain signal is applied through a series of individual driver circuits to all lines of the panel, where it may be combined with a write or erase signal on a selected basis. From a technology and cost standpoint, it is desirable to package the drive circuitry and other electronics in integrated circuit packages or chips. Since all discharges in the display occur simultaneously, and since the device represents a capacitive load which is continuously charged and discharged, the circuit specifications for such devices are demanding. Integrated circuits are ideally suited for high density, low voltage, low power digital signal processing and integrating such parameters into an integrated circuit chip will produce the lowest cost and size for a given function. However, the specifications for high voltage, high current drivers or switching circuits in integrated circuits are extremely demanding and the devices, if available, are extremely expensive. Thus, the panel drive waveforms are generated by a combination of analog and digital components and of high power and low power segments which are normally incompatible, particularly for high density packaging in integrated or semiconductor technology.

As heretofore noted, the plasma display panel requires a high power transition drive circuit to charge and discharge what is essentially a capacitive load which is minimized if the panel lines are driven through the voltage transitions simultaneously, eliminating the impact of interactive capacitances. Upon completion of these voltage transitions, the plasma discharges, and very high currents are required to satisfy the transfer of wall charge necessary for panel operation. The panel is then driven in the opposite direction via a controlled transition to produce an AC waveform which may have a nominal value of 200 volts peak-to-peak, with a high current plasma discharge occurring at the opposite peak voltages. Such controlled voltage transitions require analog high power switching circuits, while the plasma discharges require low impedance, low power digital switches between the panel lines and the high voltage bulk power supply.

While creating the entire sustain waveform with a discrete background analog circuit would satisfy the high power transition requirements, the accumulative impedance from the background devices and distribution would not satisfy the low impedance discharge criteria. Creating the entire waveform with fully integrated drive circuits, on the other hand, would satisfy the low impedance plasma discharge requirements, but would also incorporate the high stress, high power analog switching requirements which would affect the density, yield and reliability capabilities of the integrated circuit.

SUMMARY OF THE INVENTION

The subject invention proposes to implement analog and digital circuits in a partitioned drive system in which each circuit type provides its optimum function. The result is a single, inexpensive background analog circuit using discrete components which provides DC voltage transitions to the capacitive panel lines and dissipates the accompanying switching power, and an integrated driver pair for each panel line which are switched on after the voltage transitions to provide a discharge path for the plasma discharge currents. Since the plasma discharge is very rapid and of short duration, the integrated circuit devices would be low current devices with AC capability which would occupy low chip area and allow for high density packaging. The integrated devices must be capable of tolerating 100 to 200 volts, but are switched at less than 15 volts, so high stress conditions are avoided. The resultant increased chip yields from low voltage switching circuits would provide the lowest possible integrated circuit costs. Additionally, since the background analog circuit handles the DC level shifting, the component count for the integrated circuit is optimized.

Thus, the present invention provides a technique of partitioning plasma discharge display panels drive circuitry to optimize the advantages of maximum integration and thereby provide the lowest cost, highest performance, and most reliable system operation. It also provides a technique for reducing high stress conditions on integrated output drivers via voltage comparator gates which allow the device to switch only when there is negligible voltage across the device. The invention provides improved system performance and operating margins, while avoiding the disadvantages of alternative circuit topologies while optimizing the drive circuits with significant system cost and size reduction.

Accordingly, a primary object of the present invention is to provide an improved drive system for a plasma display device.

Another object of the present invention is to provide an improved drive system for a plasma display device in which integrated circuits are combined with analog circuits in a partitioned plasma discharge panel drive circuitry to optimize the advantages of the component technologies.

The foregoing and other objects, features and advantages of the present invention will be apparent from the following description of a preferred embodiment of the invention as illustrated in the accompanying drawings.

DESCRIPTION OF A PREFERRED EMBODIMENT

Figure 1:
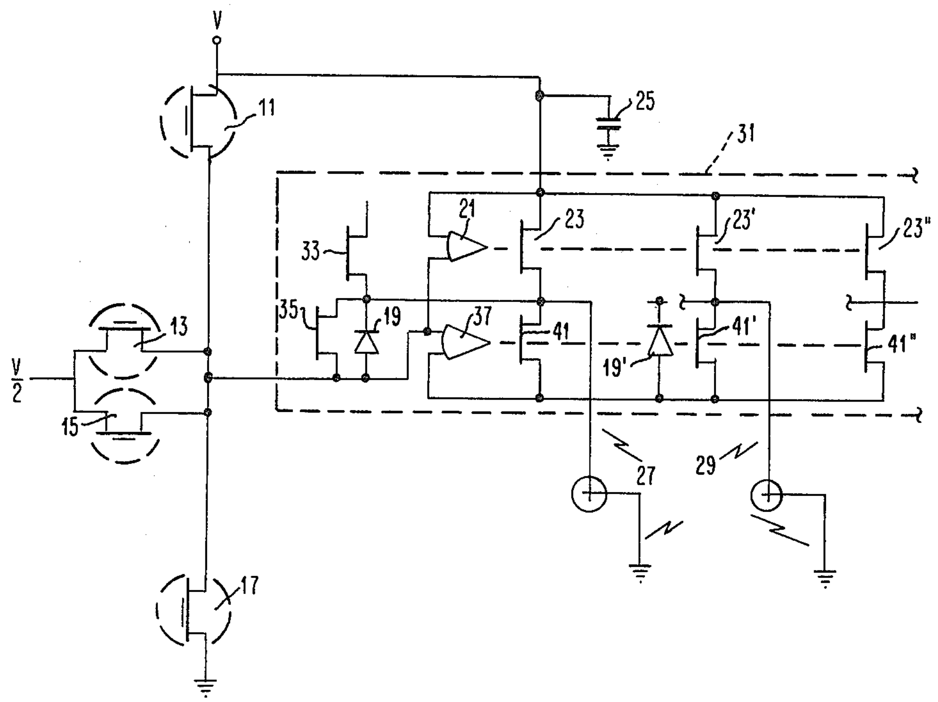
FIG. 1 illustrates in schematic form the combined analog and digital circuits utilized to generate the sustain signal.
Figure 2:
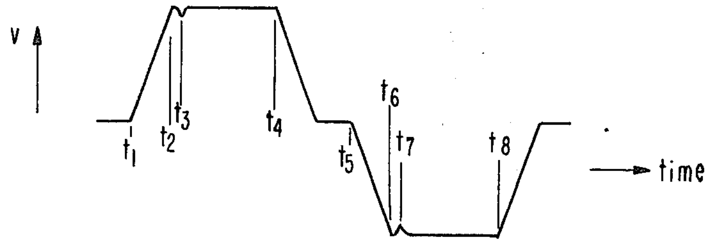
FIG. 2 illustrates a waveform of the composite sustain signal generated by the preferred embodiment of the instant invention.

Referring now to the drawings and more particularly to FIG. 1 thereof, the background analog circuit is indicated as comprising discrete transistors 11, 13, 15 and 17. The operation of the invention will be described in terms of the timing and waveform configurations of FIG. 2. Transistor 11 is turned on at time $t_1$, initiating the positive controlled voltage transition pull-up of all panel lines via associated diodes 19 to the positive level V. Normally, discharge of the panel lines occurs at time $t_3$, causing a high voltage negative spike to be generated which would distort the sustain waveform and substantially reduce the panel operating margin. Such a drop in the background sustain circuit is prevented by switching the driver circuits 23 into a low impedance mode to reduce the voltage spike to a nominal tolerable notch. At time $t_2$, voltage comparator circuit 21 senses that the transition from the reference to the upper sustain level is at or near completion, and switches on all integrated circuit devices 23, 23′, 23″. When the plasma discharge occurs at time $t_3$, a low impedance current path is provided from the high voltage capacitor 25 to the panel lines 27, 29 via devices 23, 23′, etc. While the driver integrated circuits shown as block 31 illustrates only two individual drive circuits, it will be understood that in practice a plurality of such drivers, 32 in the preferred embodiment, would be packaged in a single integrated circuit chip for optimal circuit density. The operation is completed by turning transistors 11 and 23 off prior to time $t_4$.

At time $t_4$, transistor switch 13 is turned on to pull the panel capacitance down to the reference level via device 35 to ease the stress conditions for switch 17. For purposes of this description, the stress condition defines a condition where a heavy power load instantaneously applied to a chip may self-destruct the chip. Discrete device 17 is turned on at time $t_5$, pulling the panel lines from the reference level to the negative transition level via device 35. Voltage comparator circuit 37 senses completion of the negative voltage transition and switches on all integrated devices 41, 41′, etc. A second plasma discharge occurs at time $t_7$ via the low impedance path of switches 41. Prior to time $t_8$, devices 17 and 41 are turned off and at time $t_8$, discrete device 15 pulls the panel lines back to the reference level and the cycle is repeated. The analog circuit configuration indicates how 100 volt circuits are used to generate a 200 volt peak-to-peak sustain signal using discrete transistors. Since the level switching represents a simple operation for a power switching device, low cost, high tolerance circuits may be utilized without any degradation in system performance.

Complementary devices 33 and 35, which form part of the integrated circuit package, provide the selection of panel lines during write and erase conditions. During normal sustain, device 35 is always on and device 33 always off. Voltage comparators 21, 37 are integrated into circuit chip 31, and sense a voltage level approximately 15 volts below the high voltage level for positive transitions and 15 volts above the ground reference for negative transitions. The elimination of the spike in the sustain waveform maintains the normal operating margin and permits implementation of the background circuitry in low cost discrete form. The addition of two digital comparators integrated into the driver chip adds substantially no extra cost, while improving performance as heretofore described.

By partitioning the elements of the sustain waveform between the integrated driver chip and a discrete background analog circuit, optimum integration costs, circuit performance and system reliability are achieved. The high power controlled voltage transistions are achieved via the inexpensive discrete background devices 11, 13, 15 and 17 which control all panel lines, while the low impedance, low power plasma discharge function is achieved via low stress integrated circuit modules with a pair of switches 23 and 41 for each panel line. Additionally, the partitioned analog circuits have lower performance criteria and thus are less expensive than a single circuit trying to perform all the required functions. Use of the comparator circuits provides lowest achievable stress level of the integrated output device.

While the invention has been particularly shown and described with reference to a preferred embodiment thereof, it will be understood by those skilled in the art that various changes in form and detail may be made therein without departing from the spirit and scope of the invention.

Having thus described my invention, what I claim as new, and desire to secure by Letters Patent is:

1. A composite drive system for a plasma display device having a plurality of cells defined by the intersection of orthogonal conductor arrays, the discharge of selected cells providing a visual display, comprising in combination,
   - analog circuit means for generating a background sustain signal,
   - said analog circuit means comprising a plurality of high voltage circuit means for generating a signal having positive and negative excusions from a reference level,
   - a plurality of individual line driver circuits for applying said background sustain signal to the individual lines of said panel, and
   - means for controlling the operation of said line driver circuits during discharge of said selected cells to compensate for the degradation of said background sustain signal due to said discharge.

2. A drive system of the type claimed in claim 1 wherein said plurality of high voltage circuit means in said analog circuits comprises a plurality of high voltage switching means for switching high voltage levels from said reference level.

3. A drive system of the type claimed in claim 2 wherein said high voltage switching means includes a plurality of discrete switching devices.

4. A drive system of the type claimed in claim 1 wherein said individual line driver circuits comprise an integrated driver pair for each of said panel lines to provide a discharge path for each of said selected cells.

5. A drive system of the type claimed in claim 1 wherein said means for controlling the operation of said line driver circuits during discharge comprises means for generating a signal to maintain said background circuit at its prescribed level during discharge of said selected cells.

6. A drive system of the type claimed in claim 5 wherein said signal generating means comprises voltage comparator circuits associated with said line drivers.

7. A drive system of the type claimed in claim 6 wherein said voltage comparator circuits have said high voltage switching means as one of its outputs.

8. A drive system of the type claimed in claim 7 wherein said individual line drivers, said driver pair, and said voltage comparator circuits are implemented in integrated circuit technology.

9. A drive system of the type claimed in claim 7 further comprising means for selectively generating write or erase signals.

10. A drive system of the type claimed in claim 9 wherein said means for selectively generating write or erase signals is also implemented in integrated circuit technology.

* * * * *